United States Patent [19]
Kambe et al.

[11] Patent Number: 5,979,998
[45] Date of Patent: Nov. 9, 1999

[54] HYDRAULIC PRESSURE CONTROL SYSTEM FOR A VEHICLE

[75] Inventors: Norihito Kambe, Kariya; Hiromu Kuromitsu, Chiryu, both of Japan

[73] Assignee: Aisin Seiki Kabushiki Kaisha, Kariya, Japan

[21] Appl. No.: 09/031,604

[22] Filed: Feb. 27, 1998

[30] Foreign Application Priority Data

Feb. 28, 1997 [JP] Japan ................................. 9-062157

[51] Int. Cl.$^6$ ....................................................... B60T 8/32
[52] U.S. Cl. ..................... 303/116.1; 303/10; 303/116.4; 303/119.1; 303/901
[58] Field of Search ............................. 303/116.1, 116.4, 303/116.3, 116.2, 119.1, 119.2, 900, 901, 113.1, 113.2, 113.3, 140, 139, 146, 147, 148, 10; 701/72, 73

[56] References Cited

U.S. PATENT DOCUMENTS

| | | | |
|---|---|---|---|
| 3,574,416 | 4/1971 | Skoyles | 303/69 |
| 4,012,082 | 3/1977 | Doversberger | 303/116.1 |
| 5,435,637 | 7/1995 | Harada et al. | 303/116.4 |
| 5,445,445 | 8/1995 | Yukio . | |
| 5,549,366 | 8/1996 | Toda et al. | 303/901 |

FOREIGN PATENT DOCUMENTS 64-74153  3/1989  Japan .
5-116607  5/1993  Japan .

*Primary Examiner*—Douglas C. Butler
*Attorney, Agent, or Firm*—Burns, Doane, Swecker & Mathis, LLP

[57] ABSTRACT

The present invention is directed to a hydraulic pressure control system for controlling a hydraulic pressure in each wheel brake cylinder operatively mounted on each wheel of a vehicle, which includes a modulator disposed between a master cylinder and the wheel brake cylinder for introducing thereto and draining therefrom the brake fluid. First and second pump devices are provided for introducing the brake fluid and pressurizing it to discharge the pressurized brake fluid to the wheel brake cylinder through the modulator, respectively. The second pump device has a different suction phase from the suction phase of the first pump device. A changeover valve device is disposed between the master cylinder and the modulator, and adapted to select one of a first operating position for communicating the master cylinder with the modulator and blocking the communication between the master cylinder and the first and second pump devices, and a second operating position for communicating the master cylinder with the first and second pump devices and blocking the communication between the master cylinder and the modulator. First and second check valves are disposed between the changeover valve device and the inlets of the first and second pump devices for allowing the brake fluid to flow from the changeover valve device to the first and second pump devices and blocking the reverse flow. Preferably, the outlets of the first and second pump devices are communicated with a common volume chamber.

10 Claims, 7 Drawing Sheets

HYDRAULIC PRESSURE CONTROL SYSTEM FOR A VEHICLE

BACKGROUND OF THE INVENTION

1. Field of the Invention

The present invention relates to a hydraulic pressure control system for supplying brake fluid from a master cylinder to each wheel brake cylinder through a modulator by means of a fluid pump, and storing the brake fluid drained from the wheel brake cylinder through the modulator, in a reservoir.

2. Description of the Related Arts

Recent automotive vehicles are provided with a vehicle motion control system for performing various control modes such as anti-skid control, traction control, front-rear braking force distribution control, and the like. Furthermore, it is proposed to control vehicle motion characteristics by applying the braking force to each wheel irrespective of operation of a brake pedal, thereby to perform a steering control by braking, i.e., an oversteer restraining control and an understeer restraining control. With respect to a hydraulic pressure control system for use in the above-described vehicle motion control system, is often employed such a simple system that the brake fluid in a master cylinder is supplied by a fluid pump through a modulator to each wheel brake cylinder, and that the brake fluid is drained from the wheel brake cylinder through the modulator to be stored in a reservoir. For example, in order to prevent an acceleration slip from occurring in the case where an excessive driving force is applied when starting or accelerating the vehicle, a traction control system is employed, and various pressure control systems therefor are proposed in a Japanese Patent Laid-open Publication No. 64-74153. In FIG. 3 of that publication, a single changeover valve for use in the traction control system is connected to an anti-skid control circuit of so-called circulation type.

In order to perform a traction control by means of a hydraulic pressure control device for the circulation type anti-skid control, it is proposed in a Japanese Patent Laid-open Publication No. 5-116607, that a main passage is divided upstream of a section thereof connected with a pump, to provide an additional supply passage communicated with the reservoir for storing the drained fluid, and provide an intermediate reservoir communicated with the additional supply passage. And, it is so described that the intermediate reservoir is provided so as to avoid flow resistance at an input port of the master cylinder, and a resistance in a pipe or tube for connecting the master cylinder with the hydraulic pressure control device.

The hydraulic pressure control system as shown in FIG. 3 of the above Publication No. 64-74153 relates to a system in which the anti-skid control circuit is controlled when the brake pedal is not depressed. If this circuit is used for the control to be performed irrespective of the operation of the brake pedal, not only the traction control but also the steering control by braking can be performed, so that the vehicle motion control can be performed.

When the vehicle motion control is performed by the pressure control system as disclosed in the Publication No. 64-74153, it is necessary to supply sufficient brake fluid to the anti-skid control circuit irrespective of the operation of the brake pedal. However, even if a fluid pump for supplying the sufficient brake fluid was employed, it would be difficult to ensure a sufficient suction volume (or, suction volume per unit time), because the inner diameter of the pipe to be used is limited. If the inner diameter of the pipe was enlarged to increase the suction volume, its outer diameter would be necessarily enlarged, so that it would be difficult to bend it in piping. Therefore, the outer diameter of the pipe must be limited to a certain extent, to result in the limitation of the inner diameter of the pipe. As a result, the flow resistance in the pipe will be increased, so that it will be difficult to ensure the sufficient volume of the brake fluid.

According to the suction property of an ordinary pump employed in the above system as indicated by a broken line in FIG. 7, which will be described later in detail, it is impossible to introduce into the pump the fluid more than an allowable suction volume Q0, which is determined by the inner diameter of the pipe. Therefore, the problem can not be solved simply by enlarging the volume of the pump for discharging the fluid. Consequently, it will be impossible to ensure the necessary volume for discharging the fluid by a single ordinary pump.

With respect to the system disclosed in the publication No. 5-116607, the intermediate reservoir is provided for avoiding the flow resistance caused at the input port of the master cylinder. However, a delay in the normal braking operation might be caused. In the case where that system is used for the vehicle motion control when the brake pedal is not depressed, even if the brake pedal is depressed during the vehicle motion control, the pressure in the wheel brake cylinder will not be increased. In this case, therefore, the brake pedal can not be depressed further.

SUMMARY OF THE INVENTION

Accordingly, it is an object of the present invention to provide a hydraulic pressure control system for supplying brake fluid from a master cylinder to each wheel brake cylinder through a modulator by means of a pump apparatus, and storing the brake fluid drained from the wheel brake cylinder through the modulator, in a reservoir, wherein the pump apparatus supplies a necessary volume of the brake fluid for controlling the hydraulic pressure in the wheel brake cylinder by the modulator.

In accomplish the above and other objects, a hydraulic pressure control system is provided for controlling a hydraulic pressure in each wheel brake cylinder operatively mounted on each wheel of a vehicle, and the system is provided with a master cylinder for pressurizing brake fluid to supply the pressurized brake fluid to the wheel brake cylinder in response to operation of a brake pedal, and a modulator disposed between the master cylinder and the wheel brake cylinder for introducing thereto and draining therefrom the brake fluid to control the hydraulic pressure in the wheel brake cylinder. In this system, a first pump device is provided for introducing the brake fluid from an inlet thereof and pressurizing the brake fluid to discharge the pressurized brake fluid from an outlet thereof to the wheel brake cylinder through the modulator. A second pump device is provided for introducing the brake fluid from an inlet thereof and pressurizing the brake fluid to discharge the pressurized brake fluid from an outlet thereof to the wheel brake cylinder through the modulator, with a different suction phase from the suction phase of the first pump device. A reservoir is provided for storing the brake fluid drained from the wheel brake cylinder through the modulator. A changeover valve device is disposed between the master cylinder and the modulator, and adapted to select one of a first operating position for communicating the master cylinder with the modulator and blocking the communication between the master cylinder and the inlets of the first and second pump devices, and a second operating position for communicating the master cylinder with the inlets of the first and second pump devices and blocking the communication between the master cylinder and the modulator. A first check valve is disposed between the changeover valve device and the inlet of the first pump device for allowing the brake fluid to flow from the changeover valve device to the first pump device and blocking the reverse flow. And, a second check valve is disposed between the changeover valve device and the inlet of the second pump device for allowing the brake fluid to flow from the changeover valve device to the second pump device and blocking the reverse flow. Preferably, the outlets of the first and second pump devices are communicated with a common volume chamber.

The hydraulic pressure control system may further include a third check valve which is disposed between the reservoir and a position for connecting the first check valve device with the inlet of the first pump device, and which allows the brake fluid to flow from the reservoir to the first pump device and blocks the reverse flow. Furthermore, a switching valve device may be disposed between the changeover valve device and the first check valve device to communicate therebetween or block the communication therebetween in response to operation of at least the brake pedal.

Preferably, a relief valve is disposed between the changeover valve device and the outlet of the second pump device. The relief valve allows the brake fluid to flow from the second pump device to the changeover valve device and blocks the reverse flow, when a pressure difference between the upstream and downstream of the relief valve exceeds a predetermined value.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
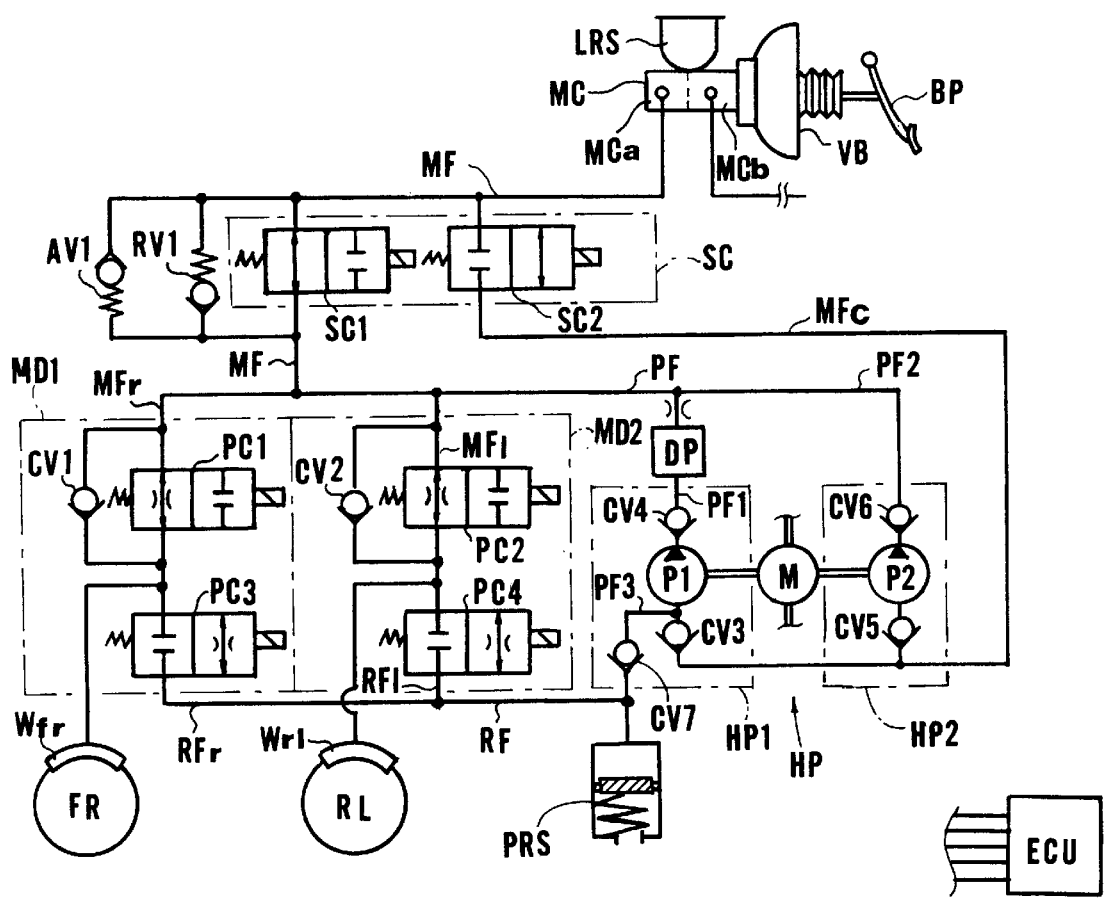
FIG. 1 is a schematic block diagram of a hydraulic pressure control system according to a first embodiment of the present invention.

Referring to FIG. 1, there is schematically illustrated a hydraulic pressure control system for a vehicle according to an embodiment of the present invention, which forms a so-called diagonal circuit system. According to the present embodiment, a master cylinder MC is a tandem master cylinder with dual pressure chambers, which are communicated with a pair of hydraulic circuits. That is, a first pressure chamber MCa is communicated with a hydraulic circuit for wheels FR, RL, while a second pressure chamber MCb is communicated with the other wheels. FIG. 1 shows only the hydraulic circuit communicated with the first pressure chamber MCa, and the other hydraulic circuit communicated with the second pressure chamber MCb is substantially the same as the former pressure circuit, so that it is omitted in FIG. 1. The wheel FR designates the wheel placed at the front right side as viewed from the position of a driver's seat, and the wheel RL designates the wheel at the rear left side. Wheel brake cylinders Wfr, Wrl are operatively mounted on the wheels FR, RL, respectively. The master cylinder MC is assisted by a vacuum booster VB, which is activated in response to depression of the brake pedal BP, to pressurize the brake fluid fed from a low pressure reservoir LRS.

The first pressure chamber MCa of the master cylinder MC is communicated with the wheel brake cylinders Wfr, Wrl, respectively, through a main passage MF and its branch passages MFr, MFl. In the main passage MF, is disposed a changeover valve device SC, which includes a pair of two-port two-position solenoid valves SC1, SC2. Also, in the branch passages MFr, MFl, are disposed normally open two-port two-position solenoid valves PC1, PC2, respectively, in parallel with which check valves CV1, CV2 are provided, respectively. The wheel brake cylinders Wfr, Wrl are connected with branch passages RFr, RFl, in which normally closed two-port two-position solenoid valves PC3, PC4 are disposed, respectively. The branch passages RFr, RFl merge into a drain passage RF, which is connected to a reservoir PRS.

The check valves CV1, CV2 allow the brake fluid to flow into the master cylinder MC and prevent it from flowing into the wheel brake cylinders Wfr, Wrl, respectively. Therefore, the brake fluid in the wheel brake cylinders Wfr, Wrl will be returned to the master cylinder MC, through the check valves CV1, CV2 and the solenoid valve SC1 in its open position, and then to the low pressure reservoir LRS. If the brake pedal BP is released, therefore, the hydraulic pressure in the wheel brake cylinders Wfr, Wrl will be rapidly reduced to the pressure in the master cylinder MC.

Figure 4:
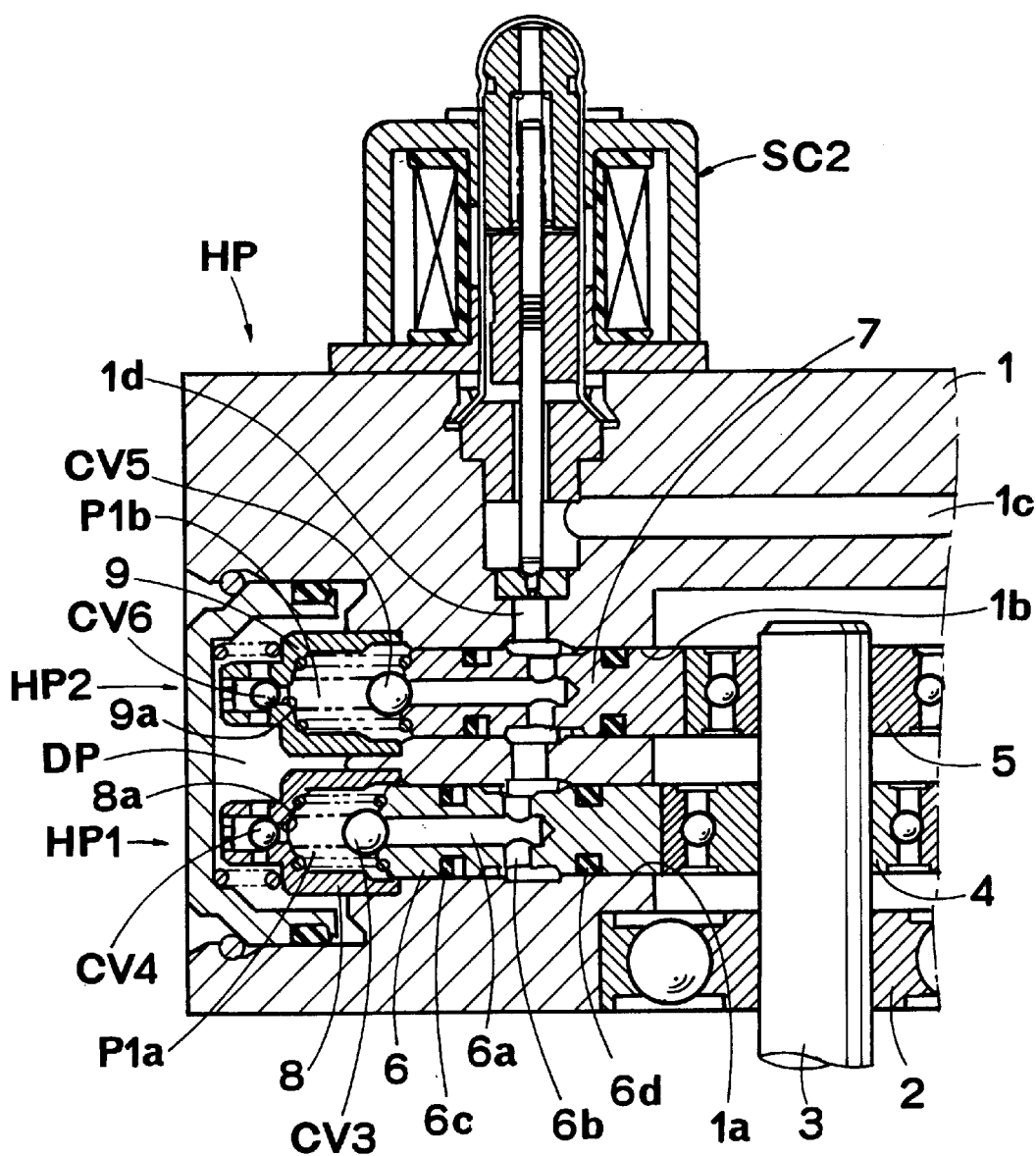
FIG. 4 is a sectional view of a part of a pump apparatus according to the second embodiment of the present invention.
Figure 7:
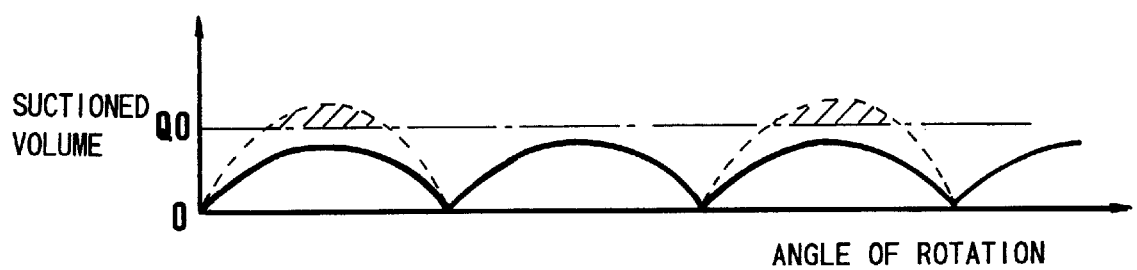
FIG. 7 is a diagram showing the suction property of the pump apparatus according to the first embodiment of the present invention comparing with a conventional pump apparatus.

With respect to the hydraulic circuit for the wheels FR, RL, the solenoid valves PC1 and PC3 serve as the modulator MD1, and the solenoid valves PC2 and PC4 serve as the modulator MD2. A passage PF is connected to the branch passages MFr, MFl at the upstream of the solenoid valves PC1, PC2, and divided into two passages PF1 and PF2, which are connected to a first pump device HP1 and a second pump device HP2, respectively. The first and second pump devices HP1, HP2 include a first fluid pump P1 and a second fluid pump P2 which have different suction phases from each other, and a first input check valve CV3 and a second input check valve CV5 connected to the inlets of the pumps P1, P2, and a first output check valve CV4 and a second output check valve CV6 connected to the outlets of the pumps P1, P2. The pump devices HP1, HP2 as a whole form a pump apparatus HP, a part of the structure thereof is shown in FIG. 4, and its suction property is indicated by a solid line in FIG. 7. The check valves CV3, CV5 allow the brake fluid to flow into the pumps P1, P2 and block the reverse flow, respectively, while the check valves CV4, CV6 allow the brake fluid to flow into the solenoid valves PC1, PC2 and block the reverse flow, respectively. The pumps P1, P2 are driven by an electric motor M to introduce the brake fluid from each inlet, pressurize the brake fluid into a certain pressure, and discharge the pressurized brake fluid from each outlet. After the motor M was energized, the pumps P1, P2 are driven continuously. The hydraulic circuit for the other wheels is substantially the same as those shown in FIG. 1, so that two pumps (not shown) therefor are driven by the motor M.

The check valve CV4 disposed at the outlet of the first pump P1 is connected to the solenoid valves PC1, PC2 through a damper DP which defines a volume chamber. The reservoir PRS is provided independently of the low pressure reservoir LRS of the master cylinder MC, and may be called as an accumulator. The reservoir PRS has a piston and a spring received in a cylinder, to store therein the brake fluid of a volume necessary to perform the various controls as described later. The reservoir PRS is communicated with a connection between the check valve CV3 and the inlet of the first pump P1 through a passage PF3, in which a third input check valve CV7 is disposed. The check valve CV7 allows the brake fluid to flow into the first pump P1 and blocks the reverse flow. According to the present embodiment, the check valve CV7 is installed in the first pump device HP1, while it may be made separately from the pump device and disposed in the passage PF3 which is connected to a position between the check valves CV3, CV5.

The solenoid valve SC1 in the changeover valve device SC is a normally open solenoid operated valve, which is disposed between the master cylinder and the solenoid valves PC1, PC2. Whereas, the solenoid valve SC2 is a normally closed solenoid operated valve, which is connected to the master cylinder MC, and connected to the pumps P1, P2 through the check valves CV3, CV5, which are disposed in a passage MFc. In parallel with the solenoid valve SC1, are provided a relief valve RV1 which is adapted to allow the flow of the brake fluid to the master cylinder MC and prevent the reverse flow when the pressure difference exceeds a predetermined pressure, and a relief valve AV1 which is adapted to allow the flow of the brake fluid to the solenoid valves PC1, PC2 and prevent the reverse flow when the pressure difference exceeds another predetermined pressure. When the pressurized brake fluid discharged from the fluid pumps P1, P2 exceeds the predetermined pressure, therefore, the brake fluid will be returned through the relief valve RV1 to the low pressure reservoir LRS via the master cylinder MC, so that the brake fluid discharged from the pumps P1, P2 will be regulated into the predetermined pressure.

The above-described solenoid valves SC1, SC2 and PC1–PC4 are controlled by the electronic controller ECU to provide various control modes including the anti-skid control, the steering control by braking, etc. When it is determined that the excessive oversteer occurs while the vehicle is undergoing a cornering maneuver, for example, the barking force will be applied to the front wheel located on the outside of the curve in the vehicle's path, for example, to produce a moment for forcing the vehicle to turn in the direction toward the outside of the curve, i.e., an outwardly oriented moment, in accordance with the oversteer restraining control, which may be called as a vehicle stability control. On the other hand, when it is determined that the excessive understeer occurs while the rear-drive vehicle like the vehicle according to the present embodiment is undergoing the cornering maneuver, for example, the barking force will be applied to the front wheel located on the outside of the curve and applied to both of the rear wheels to produce a moment for forcing the vehicle to turn in the direction toward the inside of the curve, i.e., an inwardly oriented moment, in accordance with the understeer restraining control, which may be called as a course trace performance control. The oversteer restraining control and understeer restraining control as a whole are called as the steering control by braking. The electronic controller ECU is provided with a microcomputer (not shown), which includes a central processing unit, memories, input and output ports, and etc.

In operation, every valves are placed in their normal positions and the motor M is stopped as shown in FIG. 1, during the normal braking operation. When the brake pedal BP is depressed in the conditions as shown in FIG. 1, the master cylinder MC is actuated to discharge the master cylinder pressure from the first and second pressure chambers MCa, MCb to the hydraulic pressure circuit for the wheels FR, RL, and the hydraulic pressure circuit for the other wheels, respectively, and supply the pressure into the wheel brake cylinders Wfr, Wrl, through the solenoid valve SC1 and the solenoid valves PC1, PC2.

During the braking operation, when the wheel FR tends to be locked for example, and the anti-skid control is initiated, the solenoid valve SC1 is changed to its open position, and the solenoid valve PC1 is placed in its closed position, while the solenoid valve PC3 is placed in its open position. As a result, the brake fluid in the wheel brake cylinder Wfr is drained into the reservoir PRS through the solenoid valve PC3 to reduce the pressure in the wheel brake cylinder Wfr. At this time, the brake fluid stored in the reservoir PRS is pumped up by the first pump P1 through the passage PF3 and the check valve CV7, while the pump P2 is idling, thereby to minimize the load to the second pump P2. When a gradual increase mode is selected for the wheel brake cylinder Wfr, the solenoid valve PC3 is placed in its closed position and the solenoid valve PC1 is placed in its open position, so that the master cylinder pressure is supplied from the master cylinder MC to the wheel brake cylinder Wfr through the solenoid valve PC1 in its open position. Then, the solenoid valve PC1 is opened and closed alternately, so that the pressure in the wheel brake cylinder Wfr is increased and held repeatedly like pulses thereby to be increased gradually. When a rapid increase mode is selected for the wheel brake cylinder Wfr, the solenoid valves PC2, PC3 are placed in the closed positions, and then the solenoid valve PC1 is placed in its open position, so that the master cylinder pressure is supplied from the master cylinder MC to the wheel brake cylinder Wfr. When the brake pedal BP is released and the master cylinder pressure comes to be lower than the pressure in the wheel brake cylinder Wfr, the brake fluid in the wheel brake cylinder Wfr is returned to the master cylinder MC through the check valve CV1 and the solenoid valve SC1 in its open position, and consequently to the low pressure reservoir LRS. Thus, an independent braking force control is performed with respect to each wheel.

On the other hand, when the traction control is initiated to start an anti-slip control operation for the driven wheel RL under the accelerating operation, for example, the changeover valve device SC is placed in its second operating position, with the solenoid valve SC1 changed to its closed position, and with the solenoid valve SC2 changed to its open position, and also the solenoid valve PC1 connected to the wheel brake cylinder Wfr is placed in its closed position, and the solenoid valve PC3 is placed in its open position. In this condition, if the pumps P1, P2 are driven by the motor M, the brake fluid is suctioned from the low pressure reservoir LRS through the master cylinder MC in its inoperative condition and the solenoid valve SC2 in its open position, the pressurized brake fluid will be supplied to the wheel brake cylinder Wrl for the driven wheel RL through the solenoid valve PC2 in its open position. Then, if the solenoid valve PC2 is placed in its closed position, the pressure in the wheel brake cylinder Wfr is held. Accordingly, even if the brake pedal BP is not depressed, when the acceleration slip control is made with respect to the wheel RL, for example, the solenoid valves PC2, PC4 are energized and de-energized alternately in response to the acceleration slip of the wheel RL to provide a pressure control mode for gradually increasing, decreasing or holding the pressure in the wheel brake cylinder Wrl. Whereby, the braking force is applied to the wheel RL to limit its rotating force, so that the accelerating slip is effectively prevented to perform the traction control properly. Likewise, the acceleration control is performed with respect to the wheel RR.

Furthermore, when the excessive oversteer, for example, is needed to be prevented in case of the steering control by braking, the moment for overcoming the excessive oversteer must be created. In this case, it is effective to apply the braking force only to a certain single wheel. That is, with respect to the hydraulic pressure circuit for the wheels FR, RL, the solenoid valve SC1 is placed in its closed position, and the solenoid valve SC2 is placed in its open position, i.e., the changeover valve device SC is placed in its second operating position, the motor M is driven, so that the pumps P1, P2 are actuated to discharge the pressurized brake fluid therefrom. Then, with the solenoid valves PC1–PC4 energized and de-energized alternately, the hydraulic pressure in each of the wheel braking cylinders Wfr, Wrl is gradually increased, decreased or held. Consequently, the braking force distribution between the front and rear wheels is controlled to keep the course trace performance of the vehicle.

Figure 2:
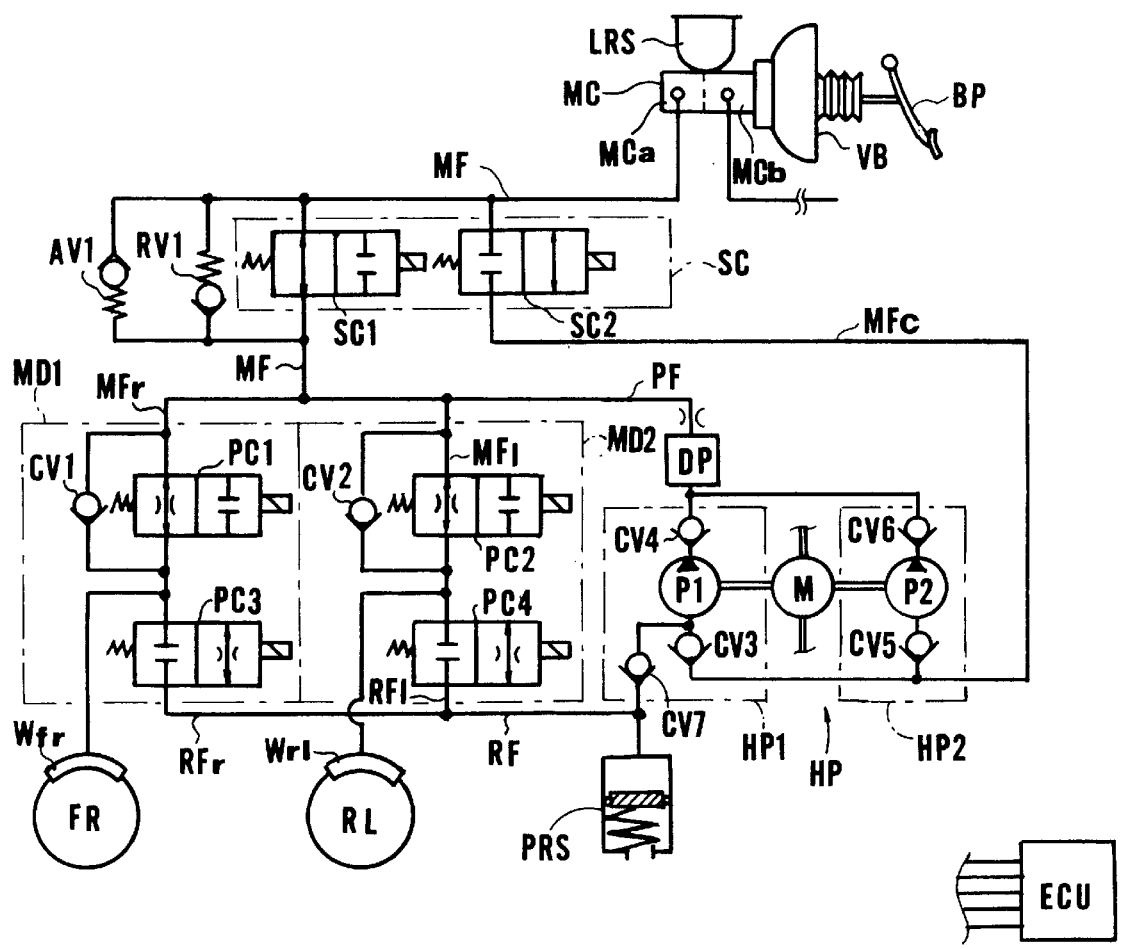
FIG. 2 is a schematic block diagram of a hydraulic pressure control system according to a second embodiment of the present invention.

FIG. 2 shows another embodiment of the present invention, wherein the outlets of the pumps P1, P2 are connected to the damper DP, which is adapted to provide a common volume chamber, as described later with reference to FIG. 4. The remaining structure is substantially the same as the embodiment in FIG. 1.

Figure 3:
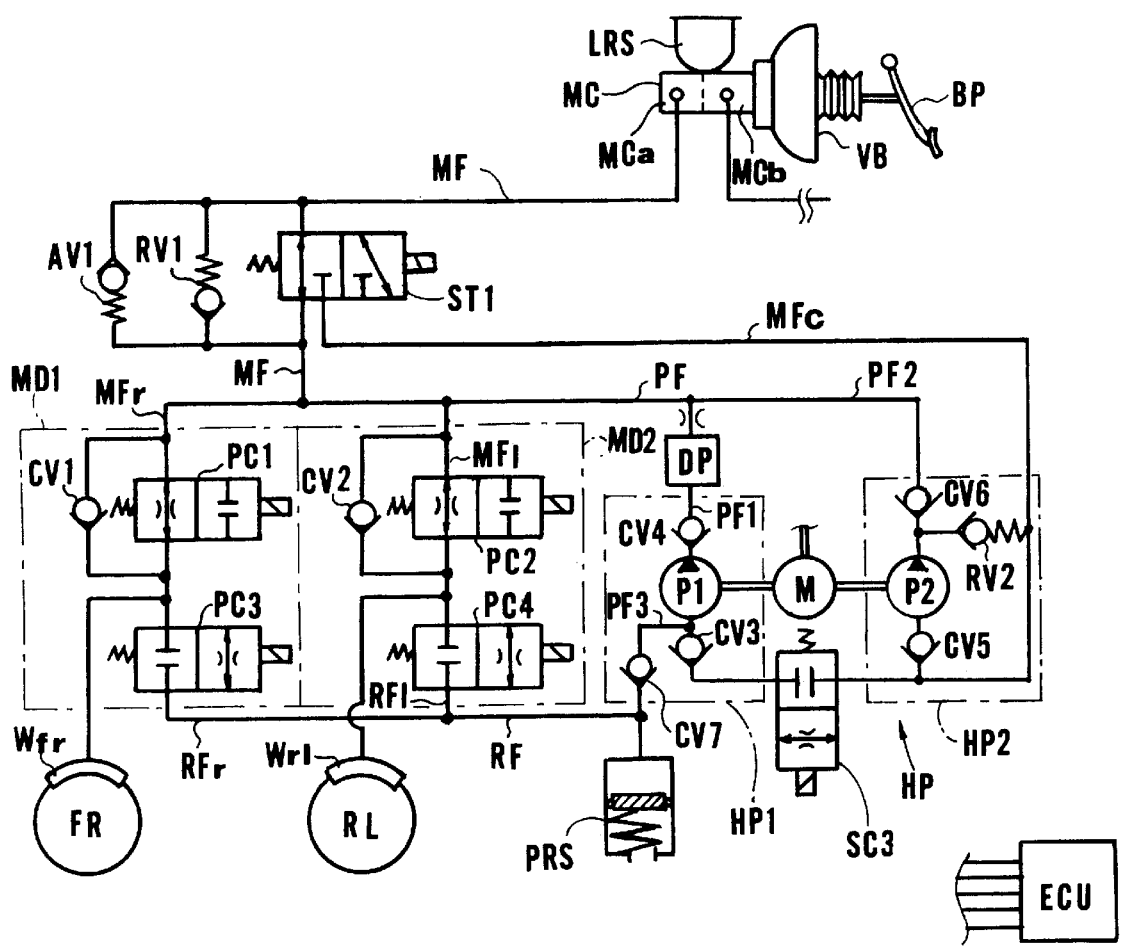
FIG. 3 is a schematic block diagram of a hydraulic pressure control system according to a third embodiment of the present invention.

FIG. 3 shows a further embodiment of the present invention, wherein the changeover valve device SC includes a three-port two-position solenoid operated changeover valve ST1, instead of the normally open solenoid valve SC1 and normally closed solenoid valve SC2 as shown in FIG. 1. A first port of the changeover valve ST1 is connected to the master cylinder MC, its second port is connected to the solenoid valves PC1, PC2, and the outlets of the pumps P1, P2, and its third port is connected to the inlets of the pumps P1, P2. When the changeover valve ST1 is not energized, it is placed in a first operating position as shown in FIG. 3, where the first port is communicated with the second port, with its third port closed, so that each of the solenoid valves PC1, PC2 is communicated with the master cylinder MC. When the changeover valve ST1 is energized, it is placed in a second operating position, where the first port is communicated with the third port, with its second port closed, so that each of the inlets of the changeover valve ST1 is communicated with the master cylinder MC through the check valves CV3, CV5. According to the present embodiment, therefore, the same functions as those performed by the valves SC1, SC2 can be done by the single changeover valve ST1.

In addition, a two-port two-position solenoid valve SC3 is disposed between the check valves CV3 and CV4 disposed near the inlets of the pumps P1, P2, as shown in FIG. 3. The solenoid valve SC3 is controlled to be opened or closed in response to operation of the brake pedal BP and in accordance with the driving condition of the vehicle. For example, during the hydraulic pressure is being controlled for the steering control by braking, when the brake pedal BP is depressed to apply additional braking force, the brake fluid in even the low pressure reservoir LRS will be fed to the reservoir PRS and stored therein. Therefore, it will be difficult to reduce the hydraulic pressure in the wheel brake cylinder to be controlled, when the anti-skid control is performed after the additional depression of the brake pedal BP was made. According to the present embodiment, therefore, the solenoid valve SC3 is adapted to be held in its open position unless the brake pedal BP is depressed, and closed when it is depressed. As a result, when the hydraulic pressure is being controlled for the steering control by braking, even if the brake pedal BP is depressed, the brake fluid in the master cylinder MC will not be fed to the first pump P1. Then, the brake fluid stored in the reservoir PRS will be properly pumped up by the pump P1.

Figure 8:
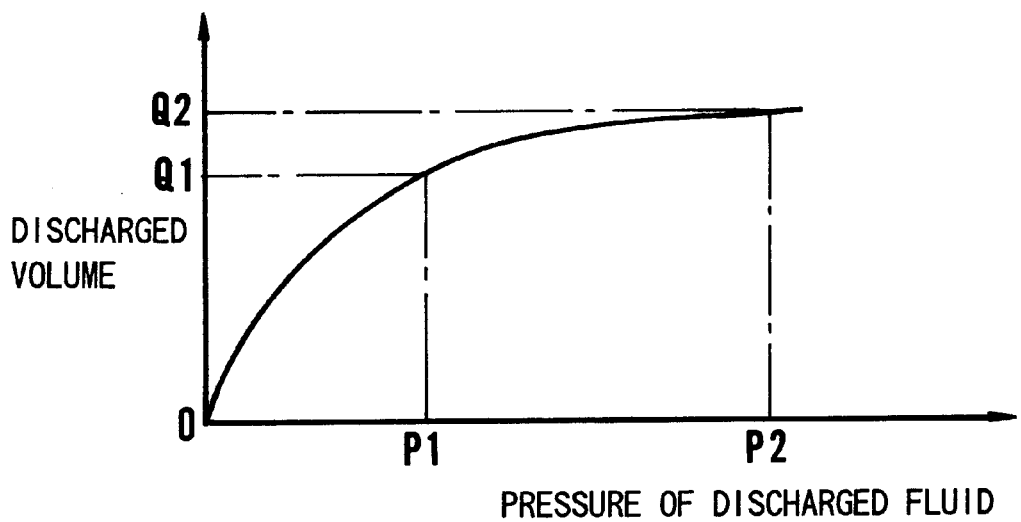
FIG. 8 is a diagram showing a relationship between the discharged pressure and discharged volume of the pump apparatus according to the second embodiment of the present invention.

Between the changeover valve ST1 and the outlet of the second pump P2, is provided a relief valve RV2 which allows the brake fluid to flow into the changeover valve ST1 and prevent the reverse flow, when the pressure difference exceeds a predetermined pressure. The relief valve RV2 of the present embodiment is opened, when the pressurized brake fluid discharged from the second pump P2 exceeds a predetermined pressure P1 (e.g., 50 atm), so that the brake fluid will be returned to the master cylinder MC through the valve ST1, then to the low pressure reservoir LRS. As shown in FIG. 8, the increasing rate of the volume of the brake fluid (Q1 to Q2) is small comparing with the increasing rate of the pressure of the discharged brake fluid (P1 to P2), when the discharged brake fluid exceeds the predetermined pressure P1. Therefore, it is possible to keep the necessary volume of the discharged brake fluid. As a result, if the brake fluid discharged from the second pump P2 exceeds the predetermined pressure P1 when the solenoid valve SC3 is placed in its open position, the pressurizing operation by the second pump P2 will not be performed, but only the pressurizing operation by the first pump P1 will be performed, so that the load to the motor M will be reduced to a great extent. Since the remaining elements in the present embodiment are substantially the same as those shown in FIG. 1, the explanation of them will be omitted.

The pump apparatus HP and changeover valve device SC are formed in a body, according to the present embodiment, e.g., in a housing 1 as shown in FIG. 4. The housing 1 includes a first cylinder 1a and a second cylinder 1b defined therein in parallel with each other, and the damper DP which serves as the volume chamber communicating with one end of each cylinder. The housing 1 has a suction passage 1c defined therein for communicating with the cylinders 1a, 1b. One end of the suction passage 1c is communicated with the passage MFc, while the other end of the passage 1c is communicated with the cylinders 1a, 1b to serve as an input port 1d. And, a first plunger 6 and a second plunger 7 are received slidably and fluid-tightly in the cylinders 1a, 1b, respectively. The housing 1 further includes a shaft 3 which is rotatably mounted on a bearing 2 fixed to the housing 1 perpendicularly to the cylinders 1a, 1b. A pair of cum members 4, 5 are secured to an end portion of the shaft 3, in parallel with each other. The plungers 6, 7 are so arranged that axial end faces abut on the peripheral end faces of the cum members 4, 5, respectively, and that the plungers 6, 7 reciprocate in the cylinders 1a, 1b, respectively, in response to rotation of the shaft 3. According to the present embodiment, the plungers 6, 7 are arranged to reciprocate once by each rotation of the shaft 3, to provide a phase difference by 180 degree of angle of rotation of the shaft 3.

The plunger 6 has an axial through hole 6a defined therein, and a through hole 6b defined perpendicularly to the through hole 6a for communicating with the input port 1d. The plunger 7 has the same holes as those of the plunger 6. A pair of caps or cases 8, 9 are mounted on the housing 1 to cover open end portions of the through hole 6a of the plunger 6 and that of the plunger 7, respectively, and define a first pressure chamber P1a and a second pressure chamber P1b, respectively. The cases 8, 9 have output ports 8a, 9a defined therein, through which the pressure chambers P1a, P1b communicate with the damper DP, respectively. The check valves CV3, CV5 have valve members which are disposed in the pressure chambers P1a, P1b, and urged to close the through hole 6a of the plunger 6 and that of the plunger 7, respectively. Also, the check valves CV4, CV6 have valve members which are disposed in the cases 8, 9, and urged from the damper DP toward the output ports 8a, 9a to close the same, respectively. The normally closed solenoid valve SC2 as shown in FIG. 1 is mounted on the housing 1 to open or close the suction passage 1c.

In operation, when the solenoid valve SC2 is turned on, the suction passage 1c as shown in FIG. 4 is opened. When the shaft 3 is rotated, the cum members 4, 5 are rotated to reciprocate the plungers 6, 7 in the cylinders 1a, 1b, respectively. Accordingly, when the plunger 7 is moved in the right direction in FIG. 4 to expand the pressure chamber P1b, for example, the check valve CV5 is opened, with the check valve CV6 closed, so that the brake fluid is introduced into the pressure chamber 1b through the suction passage 1c. Whereas, when the plunger 6 is moved in the left direction in FIG. 4 to compress the pressure chamber P1a, the check valve CV4 is opened, with the check valve CV3 closed, so that the brake fluid in the pressure chamber P1a is discharged into the damper DP. In response to the reciprocation of the plungers 6, 7, therefore, the suction operation is repeated with the phase difference of 180 degree to obtain the suction property as indicated by a solid line in FIG. 7. That is, the maximum volume of the suctioned brake fluid is lower than the value in the prior art as indicated by the broken line, but it is held to be lower than an allowable suction volume Q0, and the suction property indicates a continuous property varied in response to the angle of rotation of the shaft 3.

Figure 5:
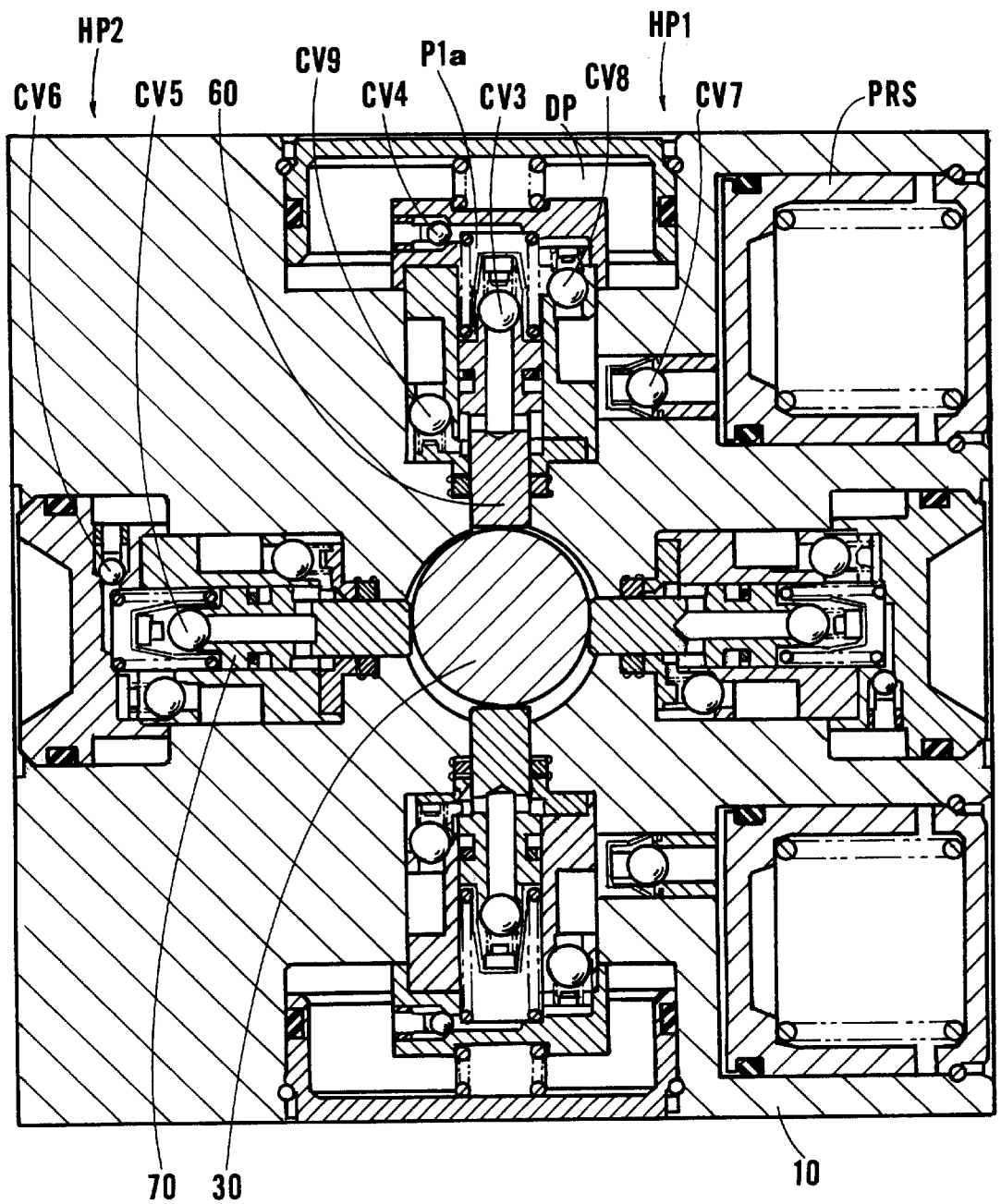
FIG. 5 is a sectional view of a pump apparatus according to the third embodiment of the present invention.
Figure 6:
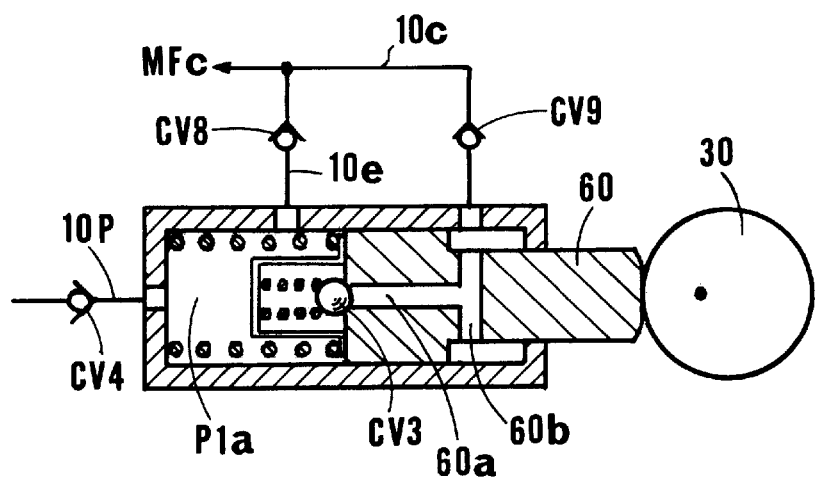
FIG. 6 is a sectional view of a basic structure of the pump apparatus according to the third embodiment of the present invention.

FIG. 5 shows another embodiment of the pump apparatus HP, and substantially the same elements as those in FIG. 4 are indicated by the same reference numerals as the numerals in FIG. 4. A housing 10 includes the first pump device HP1, the second pump device HP2, and the reservoir PRS, for use in each circuit of the dual hydraulic pressure circuits. The first and second pump devices HP1, HP2 in each circuit are arranged to produce a phase difference by 90 degree of the angle of rotation of a shaft 30. According to the embodiment as shown in FIG. 5, a plunger 60 is formed into a stepped piston as schematically illustrated in FIG. 6 to provide different areas for receiving the hydraulic pressure, between the suction side and the discharged side of the plunger 60. In addition to the check valves CV3, CV4 as shown in FIG. 4, auxiliary input check valves CV8, CV9 are disposed.

In FIG. 6, the first pressure chamber P1a is defined to cover an open end of a through hole 60a defined in the plunger 60. A discharging passage 10p and an auxiliary suction passage 10e are formed to communicate with the pressure chamber P1a. The input check valve CV3 is disposed in the pressure chamber P1a, and urged to close an open end of the through hole 60a of the plunger 60. Also, the output check valve CV4 is disposed in the discharging passage 10p, to allow the brake fluid to be discharged out of the pressure chamber P1a and block the reverse flow. And, the auxiliary input check valve CV8 is disposed in the auxiliary suction passage 10e, to allow the brake fluid to flow into the pressure chamber P1a and block the reverse flow. Furthermore, the auxiliary input check valve CV9 is disposed in the suction passage 10c, to allow the brake fluid to flow into the through hole 60b of the plunger 60 (communicated with the through hole 60a) and block the reverse flow. The plunger 60 is formed into the stepped piston, so that its area for receiving the pressure in the suction passage 10c is smaller than the area for receiving the pressure in the pressure chamber P1a.

Figure 9:
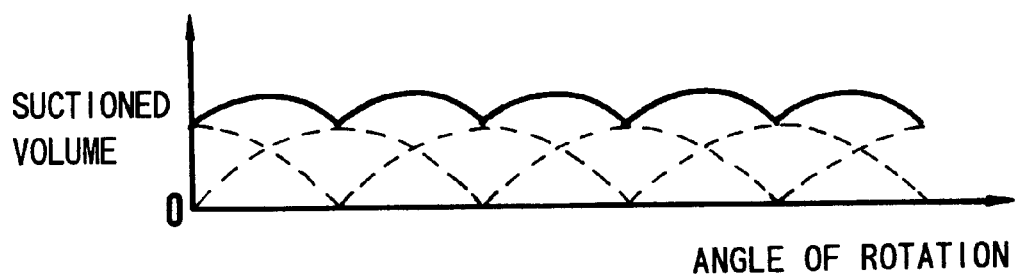
FIG. 9 is a diagram showing the suction property of the pump apparatus according to the third embodiment of the present invention.

In the first and second pump devices HP1, HP2 as shown in the upper section and left section in FIG. 5, when the shaft 30 is rotated, the plungers 60, 70 are reciprocated, respectively. Therefore, when the pressure chamber P1a as shown in FIG. 6 is expanded, for example, the check valve CV3 is opened, so that the brake fluid is introduced into the pressure chamber 1a through the suction passage 10c, check valve CV9, through holes 60a, 60b and check valve CV3, and at the same time the brake fluid is introduced into the pressure chamber P1a through the auxiliary suction passage 10e and the check valve CV8. In this case, a rate of the brake fluid supplied into the pressure chamber P1a is determined in accordance with a ratio of the area for receiving the pressure applied to the plunger 60 from the pressure chamber P1a, to the area for receiving the pressure applied to the plunger 60 from the through holes 60a, 60b. As a result, when the pressure chamber P1a is compressed, the brake fluid in the pressure chamber P1a is discharged into the damper DP (in FIG. 5) through the discharging passage 10p. Thus, with the plungers 60, 70 reciprocated, the suction of the brake fluid is performed with the phase difference by 90 degree, to obtain a continuous suction property varied smoothly in response to the angle of rotation of the shaft 30, as shown by the solid line in FIG. 9. With respect to the other pressure circuit, the same pumping operation as described above is performed by the pump devices as illustrated in the lower section and right section in FIG. 5.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic pressure control system for controlling a hydraulic pressure in each wheel brake cylinder operatively mounted on each wheel of a vehicle, comprising:

a master cylinder for pressurizing brake fluid to supply the pressurized brake fluid to said wheel brake cylinder in response to operation of a brake pedal;

a modulator disposed between said master cylinder and said wheel brake cylinder for introducing thereto and draining therefrom the brake fluid to control the hydraulic pressure in said wheel brake cylinder;

first pump means for introducing the brake fluid from an inlet thereof and pressurizing the brake fluid to discharge the pressurized brake fluid from an outlet thereof to said wheel brake cylinder through said modulator;

second pump means for introducing the brake fluid from an inlet thereof and pressurizing the brake fluid to discharge the pressurized brake fluid from an outlet thereof to said wheel brake cylinder through said modulator, said second pump means having a different suction phase from the suction phase of said first pump means;

a reservoir for storing the brake fluid drained from said wheel brake cylinder through said modulator;

changeover valve means disposed between said master cylinder and said modulator for selecting one of a first operating position for communicating said master cylinder with said modulator and blocking the communication between said master cylinder and the inlets of said first and second pump means, and a second operating position for communicating said master cylinder with the inlets of said first and second pump means and blocking the communication between said master cylinder and said modulator;

first check valve means disposed between said changeover valve means and the inlet of said first pump means for allowing the brake fluid to flow from said changeover valve means to said first pump means and blocking the reverse flow; and second check valve means disposed between said changeover valve means and the inlet of said second pump means for allowing the brake fluid to flow from said changeover valve means to said second pump means and blocking the reverse flow.

2. A hydraulic pressure control system as set forth in claim 1, wherein the outlets of said first and second pump means are communicated with a common volume chamber.

3. A hydraulic pressure control system as set forth in claim 2, wherein said first and second pump means comprises:

a housing having a first cylinder and a second cylinder defined therein in parallel with each other, and a suction passage defined therein for communicating with said cylinders, said volume chamber being defined in said housing for communicating with one end of each cylinder;

a first plunger slidably received in said first cylinder, said first plunger having a hole defined therein with one end thereof communicated with said suction passage;

a second plunger slidably received in said second cylinder, said second plunger having a hole defined therein with one end thereof communicated with said suction passage;

a shaft rotatably supported on said housing for driving said first plunger and said second plunger to reciprocate in said first cylinder and said second cylinder, respectively, with a predetermined phase difference therebetween;

a first pressure chamber defined in said housing for covering the other one end of the hole defined in said first plunger, and communicating with said volume chamber through a first output port;

a second pressure chamber defined in said housing for covering the other one end of the hole defined in said second plunger, and communicating with said volume chamber through a second output port;

a first input check valve disposed in said first pressure chamber and urged to close the other one end of the hole defined in said first plunger;

a second input check valve disposed in said second pressure chamber and urged to close the other one end of the hole defined in said second plunger;

a first output check valve disposed in said first output port for allowing the brake fluid to be discharged from said first pressure chamber and blocking the reverse flow; and a second output check valve disposed in said second output port for allowing the brake fluid to be discharged from said second pressure chamber and blocking the reverse flow.

4. A hydraulic pressure control system as set forth in claim 3, wherein said first and second plungers are adapted to reciprocate once by each rotation of said shaft to provide the phase difference by 180 degree of angle of rotation of said shaft.

5. A hydraulic pressure control system as set forth in claim 2, wherein said first and second pump means comprises:

a housing having a first cylinder and a second cylinder defined therein, a first suction passage defined therein for communicating with said first cylinder, a second suction passage defined therein for communicating with said second cylinder, a first auxiliary suction passage defined therein for communicating with said first cylinder, a second auxiliary suction passage defined therein for communicating with said second cylinder, a first discharging passage defined therein for communicating with said first cylinder, and a second discharging passage defined therein for communicating with said second cylinder;

a first plunger slidably received in said first cylinder, said first plunger having a hole defined therein with one end thereof communicated with said first suction passage;

a second plunger slidably received in said second cylinder, said second plunger having a hole defined therein with one end thereof communicated with said second suction passage;

a shaft rotatably supported on said housing for driving said first plunger and said second plunger to reciprocate in said first cylinder and said second cylinder, respectively, with a predetermined phase difference therebetween;

a first pressure chamber defined in said housing for covering the other one end of the hole defined in said first plunger, and communicating with said first discharging passage and said first auxiliary suction passage, said first plunger having the area for receiving the pressure in said first suction passage smaller than the area for receiving the pressure in said first pressure chamber;

a second pressure chamber defined in said housing for covering the other one end of the hole defined in said second plunger, and communicating with said second discharging passage and said second auxiliary suction passage, said second plunger having the area for receiving the pressure in said second suction passage smaller than the area for receiving the pressure in said second pressure chamber;

a first input check valve disposed in said first pressure chamber and urged to close the other one end of the hole defined in said first plunger;

a second input check valve disposed in said second pressure chamber and urged to close the other one end of the hole defined in said second plunger;

a first output check valve disposed in said first output port for allowing the brake fluid to be discharged from said first pressure chamber and blocking the reverse flow;

a second output check valve disposed in said second output port for allowing the brake fluid to be discharged from said second pressure chamber and blocking the reverse flow;

a first auxiliary input check valve disposed in said first auxiliary suction passage for allowing the brake fluid to flow into said first pressure chamber and blocking the reverse flow;

a second auxiliary input check valve disposed in said second auxiliary suction passage for allowing the brake fluid to flow into said second pressure chamber and blocking the reverse flow;

a third auxiliary input check valve disposed in said first suction passage for allowing the brake fluid to flow into the hole defined in said first plunge and blocking the reverse flow; and a fourth auxiliary input check valve disposed in said second suction passage for allowing the brake fluid to flow into the hole defined in said second plunger and blocking the reverse flow.

6. A hydraulic pressure control system as set forth in claim 1, further comprising:

third check valve means disposed between said reservoir and a position for connecting said first check valve means with the inlet of said first pump means, said third check valve allowing the brake fluid to flow from said reservoir to said first pump means and blocking the reverse flow.

7. A hydraulic pressure control system as set forth in claim 1, further comprising:

switching valve means disposed between said changeover valve means and said first check valve means for communicating therebetween or blocking the communication therebetween in response to operation of at least said brake pedal.

8. A hydraulic pressure control system as set forth in claim 1, further comprising:

relief valve means disposed between said changeover valve means and the outlet of said second pump means, said relief valve means allowing the brake fluid to flow from said second pump means to said changeover valve means and blocking the reverse flow, when a pressure difference between the upstream and downstream of said relief valve means exceeds a predetermined value.

9. A hydraulic pressure control system as set forth in claim 1, wherein said changeover valve means includes a normally open two-port two-position solenoid valve, and a normally closed two-port two-position solenoid valve.

10. A hydraulic pressure control system as set forth in claim 1, wherein said changeover valve means includes a three-port two-position solenoid valve having a first port connected to said master cylinder, a second port connected to the outlets of said first and second pump means, and a third port connected to the inlets of said first and second pump means.

* * * * *